United States Patent [19]

Pisharody et al.

[11] Patent Number: 5,016,342

[45] Date of Patent: May 21, 1991

[54] METHOD OF MANUFACTURING ULTRA SMALL TRACK WIDTH THIN FILM TRANSDUCERS

[75] Inventors: Raghavan K. Pisharody, Palo Alto; Beverley R. Gooch, Sunnyvale, both of Calif.

[73] Assignee: Ampex Corporation, Redwood City, Calif.

[21] Appl. No.: 373,762

[22] Filed: Jun. 30, 1989

[51] Int. Cl.⁵ ............................................. G11B 5/42
[52] U.S. Cl. ...................................... 29/603; 360/121
[58] Field of Search ................... 29/603; 360/119–121, 360/125–127

[56] References Cited

U.S. PATENT DOCUMENTS

| | | | |
|---|---|---|---|
| 3,224,074 | 12/1965 | Peters | 29/603 |
| 3,621,153 | 11/1971 | Wenner | 29/603 X |
| 4,158,213 | 6/1979 | Griffith . | |
| 4,219,853 | 8/1980 | Albert et al. . | |
| 4,246,620 | 1/1981 | Kaminaka et al. . | |
| 4,251,910 | 2/1981 | Griffith . | |
| 4,260,450 | 4/1981 | Neu . | |
| 4,281,357 | 7/1981 | Lee . | |
| 4,389,105 | 12/1984 | Lee . | |
| 4,416,056 | 11/1983 | Takahashi . | |
| 4,418,472 | 12/1983 | Lorenze, Jr. . | |
| 4,435,900 | 3/1984 | de Wilde . | |
| 4,489,484 | 12/1984 | Lee . | |
| 4,550,353 | 10/1985 | Hirai et al. . | |
| 4,652,954 | 3/1987 | Church . | |
| 4,670,972 | 6/1987 | Sakakima . | |
| 4,677,036 | 6/1987 | Nakamura et al. . | |
| 4,685,014 | 8/1987 | Hanazono et al. | 29/603 X |
| 4,701,820 | 10/1987 | McClure . | |
| 4,727,643 | 3/1988 | Schewe et al. . | |
| 4,804,816 | 2/1989 | Hata . | |

FOREIGN PATENT DOCUMENTS

| | | |
|---|---|---|
| 53-129017 | 11/1978 | Japan . |
| 61-142513 | 6/1986 | Japan . |
| 61-160817 | 7/1986 | Japan . |
| 61-210508 | 9/1986 | Japan . |
| 62-8320 | 1/1987 | Japan . |
| 980145 | 12/1982 | U.S.S.R. . |

OTHER PUBLICATIONS

Solid State Technology, Dec. 1985, "Seimiconductor Applications of Focused Ion Beam Micromachining", D. C. Shaver & B. W. Ward.

Primary Examiner—Carl E. Hall
Attorney, Agent, or Firm—Elizabeth E. Strnad

[57] ABSTRACT

An ultra small track width magnetic transducer and manufacturing method. The transducer has two coplanar confronting magnetic poles provided by a thin film layer of magnetic material. The thickness of the layer defines a track width. A transducing gap is etched in the magnetic layer by utilizing focused ion beam milling technology. The thusly obtained gap has a predetermined length and depth and it separates the magnetic layer into two confronting coplaner magnetic poles. A layer of non-magnetic material is deposited over the magnetic layer to fill the transducing gap. The transducing gap may be etched in a plane extending orthogonally to the plane of the magnetic core layer. Alternatively, the transducing gap plane may extend at an oblique angle to the magnetic core layer to obtain a transducing gap useful in aszimuth recording/playback.

12 Claims, 6 Drawing Sheets

METHOD OF MANUFACTURING ULTRA SMALL TRACK WIDTH THIN FILM TRANSDUCERS

The invention relates to a thin film magnetic transducer having an extremely small track width, gap length and overall size, suitable for very high frequency, high areal density recording/playback.

BACKGROUND OF THE INVENTION

In magnetic recording/reproducing technology there is a tendency to increase the frequency of the information signal recorded on a medium, while also increasing the areal density of the recorded signal. This leads to a continuing effort to reduce the track width and transducing gap length of magnetic transducers, as well as their overall size. As it is commonly known, reduction of the track width increases track density per unit area of medium surface, reduction of gap length increases the upper frequency limit and thereby bit density of the signal to be recorded, and reduction of the overall size decreases head inductance. Conventional ferrite heads do not yield extremely narrow track widths or thin magnetic core laminations, because of the inherent brittleness, and consequent chipping and breaking of the ferrite material during manufacturing, handling or operation.

Conventional thin film inductive heads built by material deposition and photolithographic techniques generally have a layer of non-magnetic transducing gap material superposed between two subsequently deposited layers of magnetic pole material. The thickness of the non-magnetic layer defines the gap length. In accordance with the known method of building a thin film transducer, usually a first magnetic pole forming layer is deposited on a substrate. Then a non-magnetic transducing gap material is deposited over the first magnetic layer, followed by a second magnetic layer, which forms the second magnetic pole. A desired track width is obtained by utilizing known masking techniques during the material deposition, where the resulting track width is determined by the width of the mask, or by etching after the deposition. These conventional thin film transducers are known to demonstrate deterioration in head efficiency at very narrow track widths due to misaligned domain configurations at the pole tips. Particularly, when each of the pole tip forming layers is deposited during a different material deposition step, and therefore possibly under slightly different conditions, the resulting misaligned domain orientations will cause non-uniform magnetic properties to occur at the pole tips. In addition, the accuracy of the track width largely depends on the limitations imposed by the resolution of the mask itself and of the particular masking technique utilized. Furthermore, for transducers having very small dimensions and small tolerances, the use of photolithographic techniques is known to provide low yield.

SUMMARY OF THE INVENTION

The invention is related to a thin film magnetic transducer having an extremely small track width, gap length and overall transducer size, suitable for very high frequency and high areal density recording/playback. The method of making the transducer in accordance with the invention is considerably simplified, and the accuracy of the transducer parameters and tolerances are significantly improved when comparing to known thin film transducers.

The thin film transducer of the invention has a layer of magnetic core material, preferably a highly permeable soft magnetic material, which is separated by a transducing gap having a predetermined length and depth, to define two coplanar confronting magnetic poles. The thickness of the magnetic material layer defines the track width of the transducer. The transducer has a layer of non-magnetic material superposed with the separated magnetic layer and filling the transducing gap.

In accordance with the method of the invention, a layer of magnetic material, preferably a highly permeable soft magnetic material, is deposited on a non-magnetic substrate. The thickness of the layer defines the track width of the transducer. A focused ion beam is applied to the magnetic layer to remove a portion of that layer by focused ion beam milling, to obtain a transducing gap. The thusly obtained gap has a predetermined depth and length, and it separates the magnetic layer into two coplanar confronting magnetic poles, each pole extending on the opposite side of the transducing gap. Thereafter a layer of non-magnetic material is deposited over the separated layer of magnetic material to fill the transducing gap. As it will follow from the detailed description, the method of the invention substantially simplifies the process of making thin film transducers.

It will be further appreciated that the invention provides a novel magnetic transducer, which may have an extremely narrow track width in the order of 0.25 microns or less, with an accuracy within tens of Angstroms. By using the focused ion beam milling technique, extremely accurate transducing gap dimensions are obtained, while the minimum obtainable gap length is limited only by the smallest obtainable diameter of the focused ion beam. In addition, the overall size of the transducer core may be made very small, thereby minimizing inductance. The aboveindicated features render the transducer of the invention suitable for very high frequency, high density applications, such as high definition television signal recording/playback, or other high bandwidth signal recording/playback operations, in the order of 100 MHz and above.

In the focused ion beam milling technology, the beam may be focused accurately without the need to mask the magnetic core layer during the transducing gap milling process. There is a further advantage that one or more gaps may be milled at any desired location or at any desired angle in the magnetic layer, by simply redirecting the ion beam. In accordance with the method of the invention, transducing gaps may be provided at right angles, as well as at a desired oblique angle with respect to the plane of the magnetic core layer. In comparison, when it was necessary to change the location or angle of a gap in a prior art transducer, the entire transducer structure had to be redesigned.

As it is well known in the art, commercially available ion guns utilizing the focused ion beam (FIB) milling technology are capable of milling ultra thin film while providing very sharp, well defined vertical walls and a precise geometry of the resulting cut at micron and sub-micron dimensions with very high aspect ratios. The focused ion beam is preferably obtained by a known method of extracting Gallium ions from a liquid metal ion source. Because of the relatively small size of gallium ions with respect to ions of other beam forming materials, they can be focused into a very small diameter beam. The ion beam is focused by lens elements to a narrow spot size, for example 0.2 micron in diameter. Positioning accuracy to a fraction of the beam diameter is achieved by computer control of an electrostatic/optic deflector.

A plurality of transducers in accordance with the invention may be batch fabricated simultaneously on a single substrate, and the individual transducers may be separated by dicing. When batch fabrication techniques are utilized, there is an advantage that the magnetic core material for all the transducers is deposited during the same process and all the transducing gaps are formed by the same beam while the transducers are attached to the common substrate. This results in uniformity of all transducers, and particularly in obtaining uniform gap geometry.

In accordance with one embodiment of the invention, a plurality of identical thin film ultra narrow track transducers is stacked to obtain a multitrack magnetic transducer assembly. Adjacent transducers are separated from each-other by non-magnetic spacers and magnetic shields to reduce cross talk.

In accordance with another embodiment of the invention, a number of individual transducers having extremely small track width and gap length are manufactured simultaneously by direct material deposition along a periphery of a disk shaped substrate, for use in a rotary scan recording/playback device. The transducers are spaced at a predetermined distance from each-other to obtain a desired recording format. These transducers are preferably batch fabricated simultaneously on the common substrate, in accordance with the teaching of the present invention, utilizing the same focused ion beam to provide all the transducing gaps.

It will be appreciated that the thusly manufactured scanner maintains uniform angular spacing between the transducers, and uniform magnetic, as well as electrical properties, and very precise mechanical tolerances of all the transducers are obtained. At the same time very small head geometry with extremely narrow accurate track width and small gap length is obtained, as it is necessary for example in high frequency, high density, narrow track magnetic recording/playback.

DETAILED DESCRIPTION

Figure 1A:
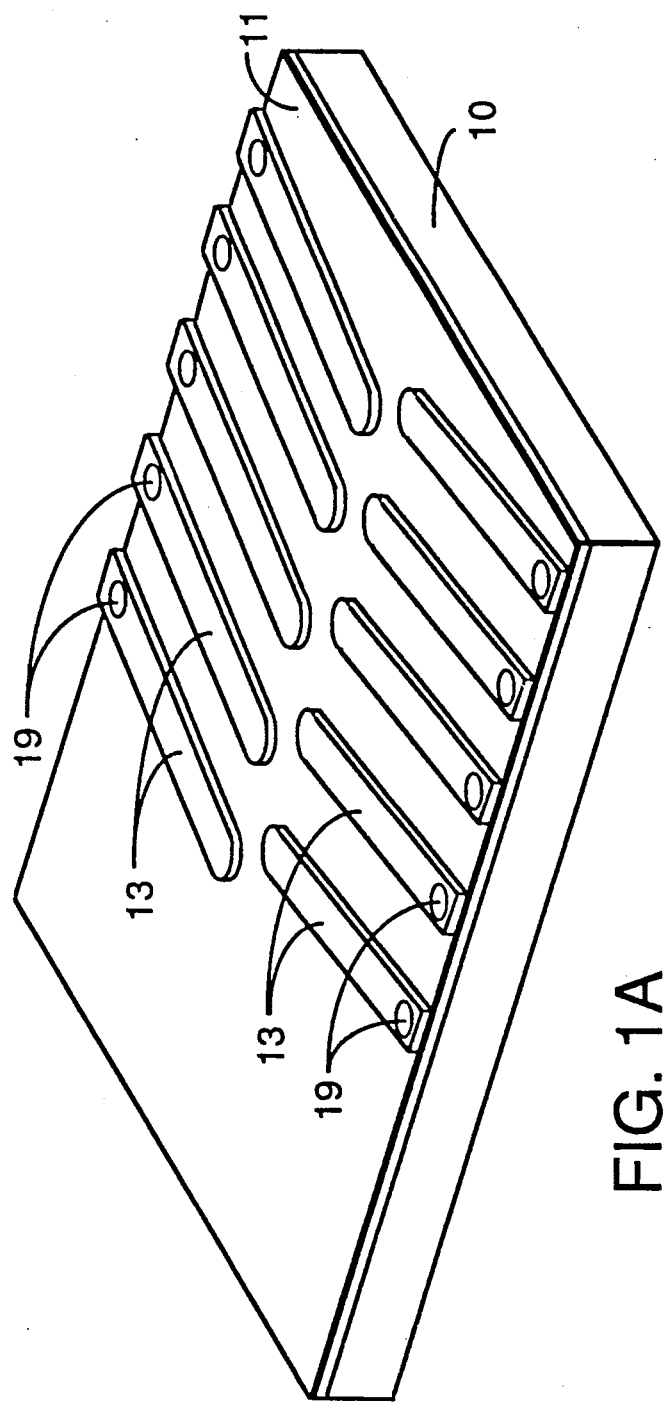
FIGS. 1A to 1C are schematic perspective views showing subsequent method steps utilized in the fabrication of the ultra narrow track transducer in accordance with the preferred method of the invention.

In the following description corresponding elements are designated by corresponding reference numerals in all the drawing figures to facilitate comparsion.

A preferred method of making a thin film magnetic transducer in accordance with the invention is described below with reference to FIGS. 1A to 1C. With further reference to FIG. 1A, a flat, thin substrate 10 of a suitable nonmagnetic, non-conducting material, for example alumina, 125 to 250 microns thick, is prepared. It will be understood that other suitable substrate materials, such as glass or silicon, may be utilized as well. Preferably a plurality of magnetic transducers (not shown) in accordance with the present invention are manufactured simultaneously on the same substrate during a single batch fabrication process. Because batch fabrication techniques per se are well known in the art, the preferred method will be described with respect to manufacturing a single transducer, to simplify the description.

The substrate 10 is polished flat on both sides, for example mechanically lapped, and cleaned thoroughly. To improve the electrical insulation of the substrate, an insulation layer 11, for example of silicon dioxide, approximately 1500 Angstroms thick, is deposited on the substrate 10 utilizing well known techniques, such as sputtering or oxidation.

Thereafter lower conductor leads 13 of a desired shape are made utilizing well known photolithography and masking techniques as follows. A layer of electrically conducting material, preferably copper (not shown), approximately 2 microns thick is deposited by sputtering in vacuum over layer 11, utilizing well known sputtering techniques as follows. The copper layer is coated with a suitable photoresist material, for example WAYCOAT HPR-206, manufactured by Hunt Chemicals Corporation. A suitable mask (not shown) in the shape of the desired conductor leads 13 having holes 19 at outer terminals, is photographed on the photoresist. After developing the resulting photo image, the areas not covered by the mask are etched to remove the conductor layer therefrom. During this step the insulation layer 11 between adjacent leads 13 is exposed, thereby separating the individual conductor leads 13 from each other. A mask is utilized to protect the holes 19 from being covered by subsequently deposited layers, so that connection may be made with subsequently deposited upper conductor leads, as it will follow from further description.

Figure 1B:
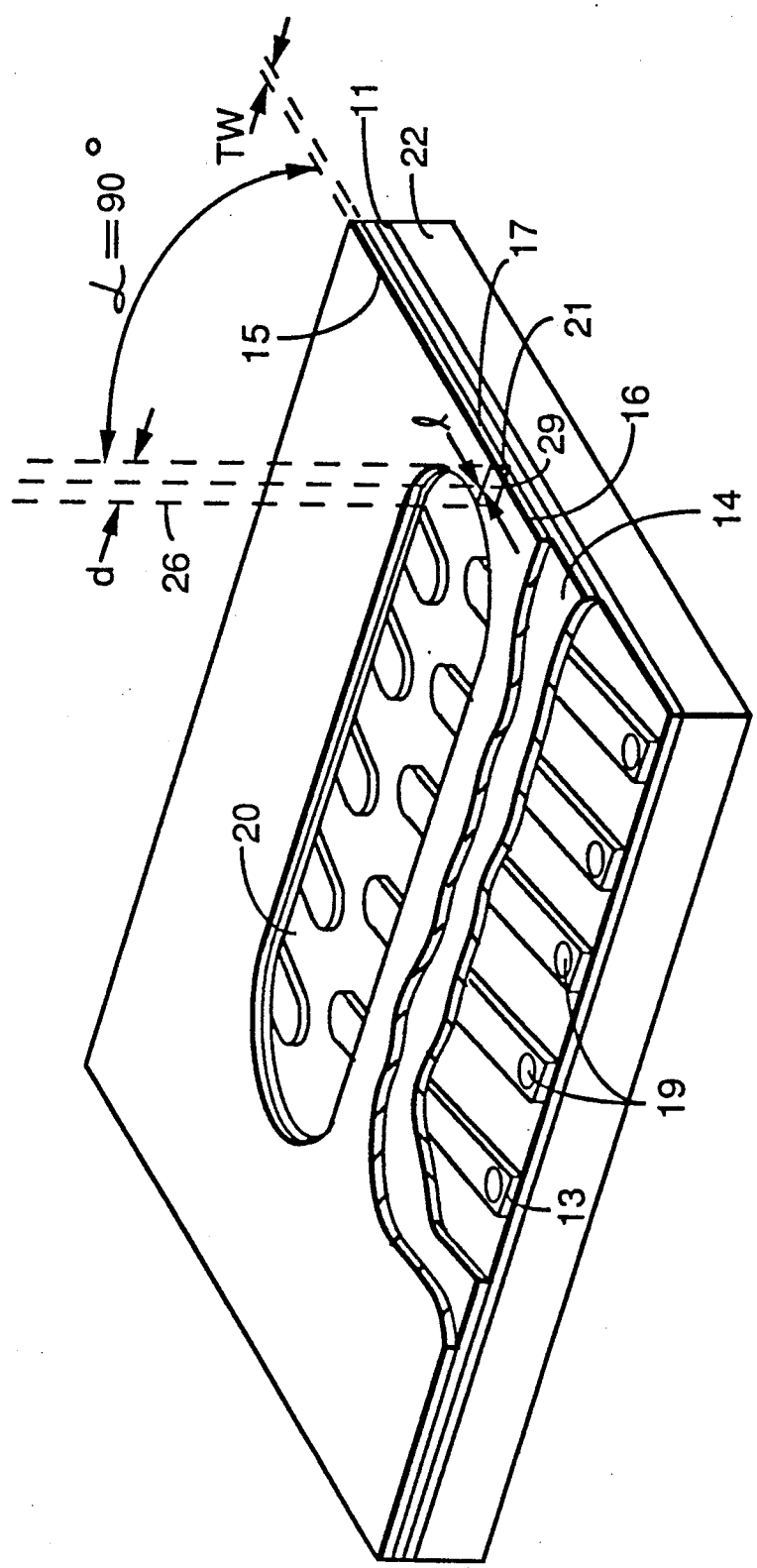

With reference to FIG. 1B, a further insulation layer 14, for example alumina, is deposited, for example sputtered over the conductor leads 13 and exposed areas of the insulation layer 11, using known sputtering techniques. Thereafter a layer 15 of thin film magnetic core material is deposited, for example sputtered, on insulation layer 14. Preferably a highly permeable, low coercive force (soft) magnetic material is utilized, such as Sendust, permalloy or amorphous material. In accordance with a particular feature of the invention, the thickness of layer 15 determines the track width TW of the transducer. Preferably TW=0.25 microns, but may be larger or smaller if desired. Thereafter the winding window 20 is provided as follows. Using known photolithographic and masking techniques, the winding window is etched out from both superposed layers 14, 15, by providing a mask in the desired shape, depositing photoresist, masking and etching in a known manner.

As it is seen in FIG. 1B, the resulting winding window exposes the inner terminals of conductor leads 13, so that they may be connected with upper conductor leads to be deposited, as it will be further described.

During the following method step, a transducing gap 21 is formed as follows. In accordance with an important feature of the method of the invention, the transducing gap is provided by Focused Ion Beam (FIB) etching (also referred to as milling) technology. The focused ion beam, as it is shown for example at 26 in FIG. 1B, is preferably obtained by a known method of heating and vaporizing liquid gallium. Electrostatic-optic reflectors may be utilized for focusing to obtain a very sharp beam. Details of the Focused Ion Beam milling technology are described for example in Solid State Technology, December 1985, in an article entitled Semiconductor Applications Of Focused Ion Beam Micromachining, by D. C. Shaver and B. W. Ward. An example of a focused ion beam gun, which may be utilized to provide a transducing gap in accordance with the teaching of the present invention, is type FEI 25 keV Electrostatic Ion Gun, manufactured by FEI Corporation, Hillsboro, Or. For example a focused ion beam having a diameter of 0.2 microns and a beam current of 0.3 nA is utilized. In the preferred embodiment the beam 26 is applied perpendicularly to the plane of layer 15 and it is moved with precision in a plane perpendicular to layer 15 in a direction of the transducing gap depth d between the face 22 of the transducer and the winding window 20. As a result, a transducing gap 21 is accurately etched into the magnetic layer 15. The gap 21 separates that layer into two coplanar confronting magnetic poles 16, 17. In the preferred embodiment the gap length 1 corresponds to the diameter of the beam 26, and it is approximately 0.375 microns, with an accuracy of tens of Angstroms, and the gap depth d is 12.7 microns.

The thusly obtained transducing gap is well defined by sharp vertical walls, resulting in precise geometry of the gap at micron and submicron dimensions. At the present state of the FIB milling technology the thickness of the thin film magnetic layer 15 to be etched should not exceed 2 microns. When the thickness of the layer is larger, the resulting milled walls tend to provide a gentle slope, due to redeposition of some of the milled materials along the walls. Because of the extreme sharpness of the beam and the precision at which it can be directed at the area of the transducing gap to be formed, masking is not needed during the gap forming process.

Figure 1C:
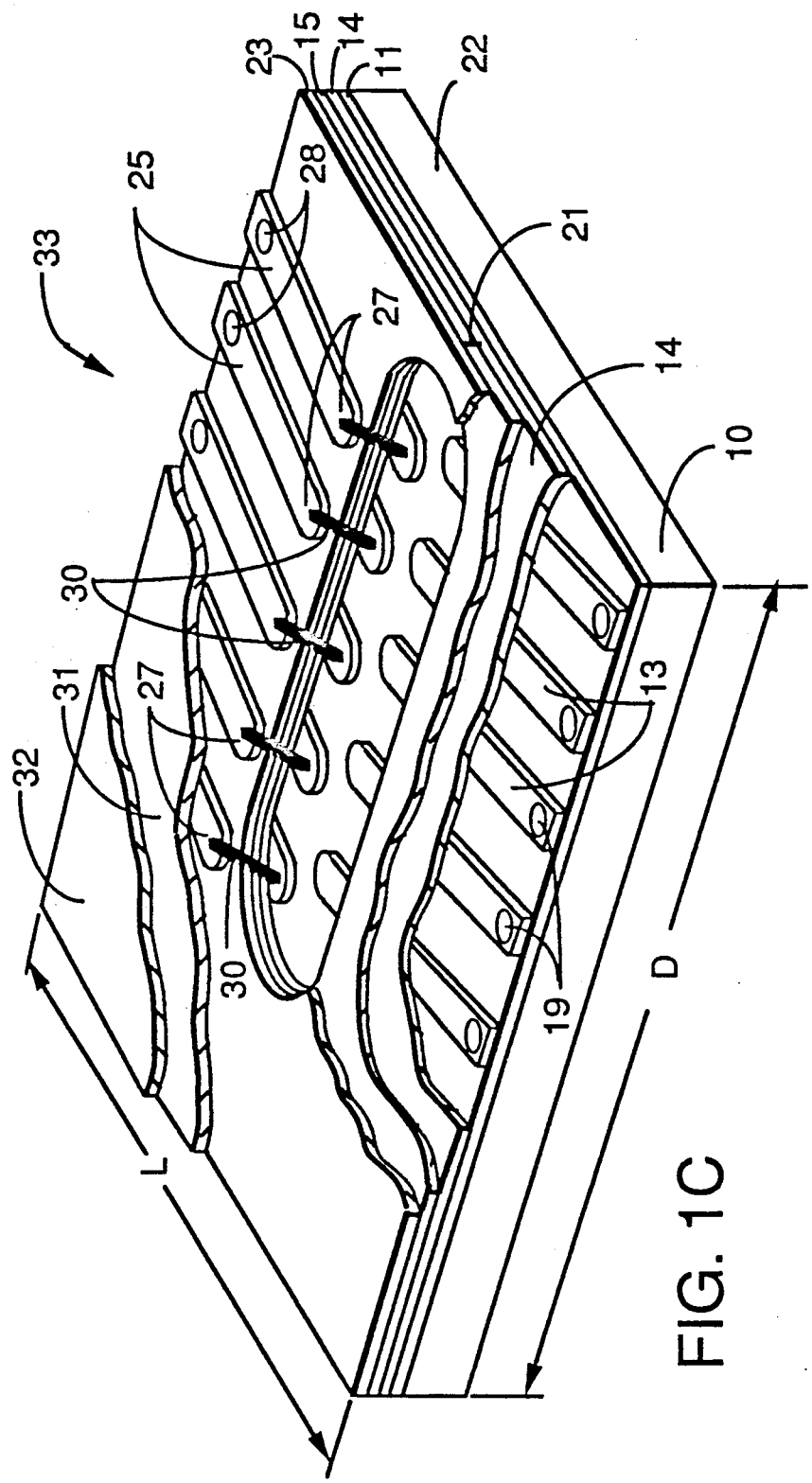

With further reference to FIG. 1C, an insulation layer 23, preferably alumina, is deposited, for example sputtered, over the thin film magnetic core layer 15, while it fills the transducing gap 21. During the process of depositing layer 23 the exposed terminals of the lower conductor leads 13 in the winding window 20 are masked by a suitable mask (not shown), utilizing well known masking techniques. This prevents these terminals from being covered by the insulation layer 23.

Thereafter the mask is removed to uncover the terminals, and upper conductor leads 25 are made as follows. A layer of conductive material, preferably the same copper material as that of the lower conductor leads 13, is sputtered over the insulation layer 23, as well as over the exposed terminals of conductors 13 in the winding window. The upper conductor leads 25 and connections 30 between the upper and lower conductor leads are formed as follows. The upper conductor leads 25 of a desired shape are formed from the upper conductor layer using the previously described method steps related to forming the lower leads 13, that is by depositing photoresist, masking and etching, as it has been described. During the etching step a portion of the copper layer is removed, leaving only leads 25 of a desired shape, with holes 28 at outer terminals, as it has been defined by the masking step. Insulated wire connections 30 as shown in FIG. 1C may be soldered to the coil terminals to connect the lower leads 13 to the upper leads 25 through the winding window 20. The coil is completed by connecting the upper and lower conductor leads via the holes 19, 28 to obtain a spiral transducer coil.

The above-described method steps provide a basic configuration of the magnetic transducer in accordance with the invention. However, in the preferred embodiment there is further deposited an upper protective layer 31 of a non-magnetic, non-conducting material, which protects the thin film transducer from mechanical damage during handling and operation. Preferably the layer 31 is made of alumina or another suitable material, and it has a thickness in the order of 20 microns to provide proper protection.

A layer 32 of a magnetic shield material, for example Sendust, permalloy or amorphous material, may further be sputtered over the upper protective layer 31. The magnetic shield layer 32 reduces any influences that external fields may have on the transducer. Particularly, when used in multitrack transducer configuration, the shield reduces crosstalk, as it is known in the art. The resulting thin film transducer 33 of the preferred embodiment is shown in FIG. 1C.

It follows from foregoing description that if it is desired to build a transducer with more than one recording track, for example a two-track transducer, the above-described method steps related to the deposition of subsequent layers may be repeated, starting with a new insulation layer corresponding to layer 14 on top of the magnetic shield layer, and so on, following the above description with reference to FIGS. 1A to 1C.

It will be understood by those skilled in the art that preferably the same magnetic material is utilized for both the magnetic core as well as the shields, to reduce the effect of differential thermal expansion. For similar reasons it is preferred to provide the substrate 10 and insulation layers 14, 23 and 31 of the same non-magnetic electrically insulating material.

When several magnetic transducers are fabricated simultaneously on the same substrate during a batch fabrication process, the individual transducers are separated from each-other, preferably diced, after all the steps necessary to build the individual transducers are completed. The individual transducers may be contoured, if desired, at the face 22, utilizing well known techniques. Each individual transducer may be mounted in a suitable conventional head mount, also referred to as "shoe" (not shown), in a well known manner.

From the foregoing description, it will be appreciated that when utilizing the above-described method of the invention, a transducer structure, as shown in FIG. 1C, having very small dimensions may be obtained. In the preferred embodiment the length 1 and the depth d of the transducer are both equal to 500 microns. With respect to the overall small size of the transducer, its inductance is significantly reduced, in turn reducing the high frequency losses. In the preferred embodiment the frequency of the recorded and played back information signal is 100 MHz or higher.

Figure 2:
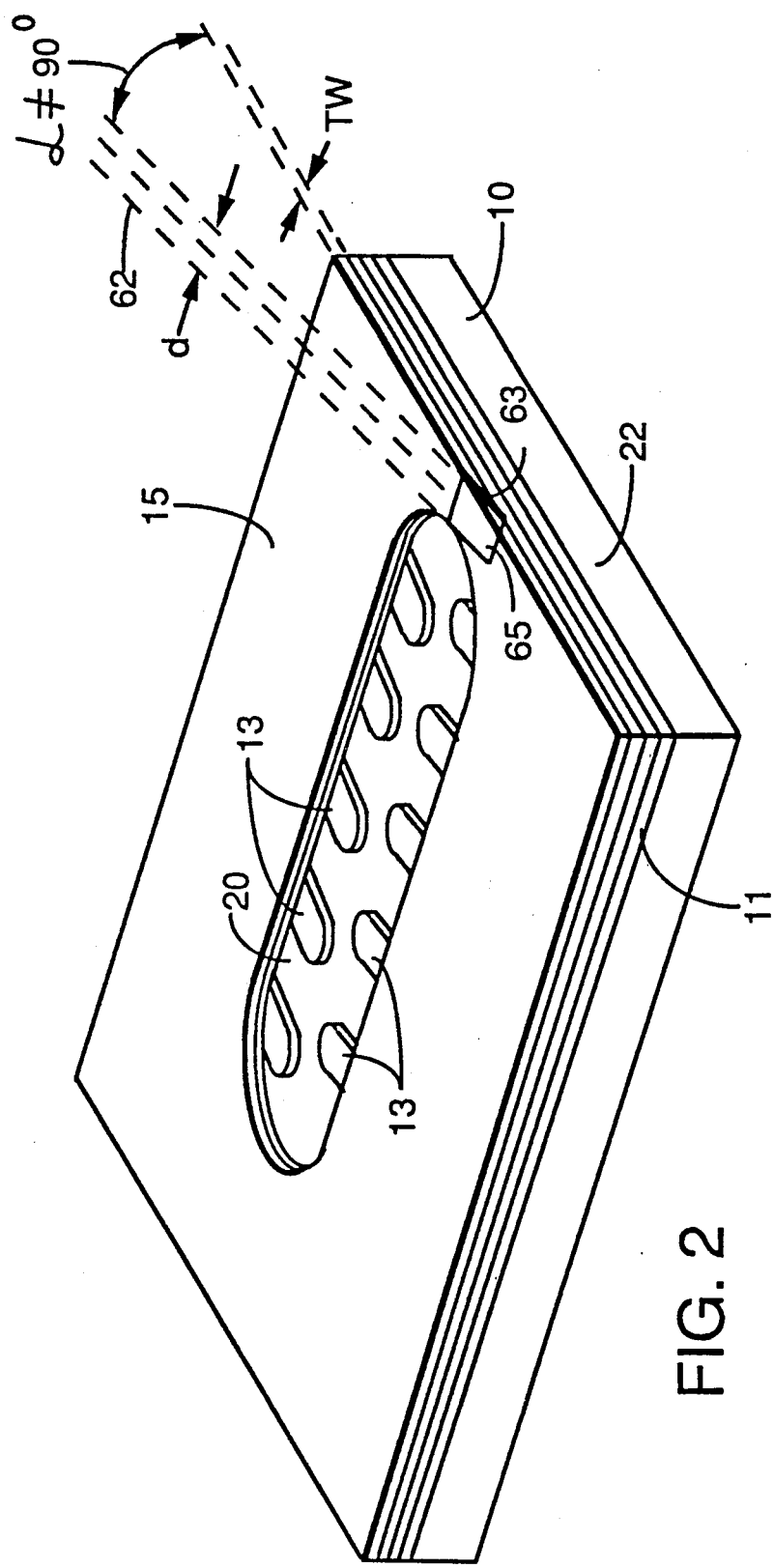
FIG. 2 shows an alternative method step to the step shown in FIG. 1B.

An alternative method step, corresponding to the above-described step with reference to FIG. 1B is shown in FIG. 2 and will be described below. As being different from the embodiment of FIG. 1B, the focused ion beam 62 in FIG. 2 is directed with respect to layer 15 of the magnetic core material at an oblique angle. Consequently the resulting gap plane 65 extends at an oblique angle alpha with respect to the plane of layer 15, but it extends perpendicularly to transducer face 22 at the transducer-to-medium contact surface. The resulting transducer structure will have a transducing gap 63 extending at a desired azimuth with respect to the track width, and therefore may be suitable for well known azimuth recording/playback of signals on a magnetic medium.

Figure 3:
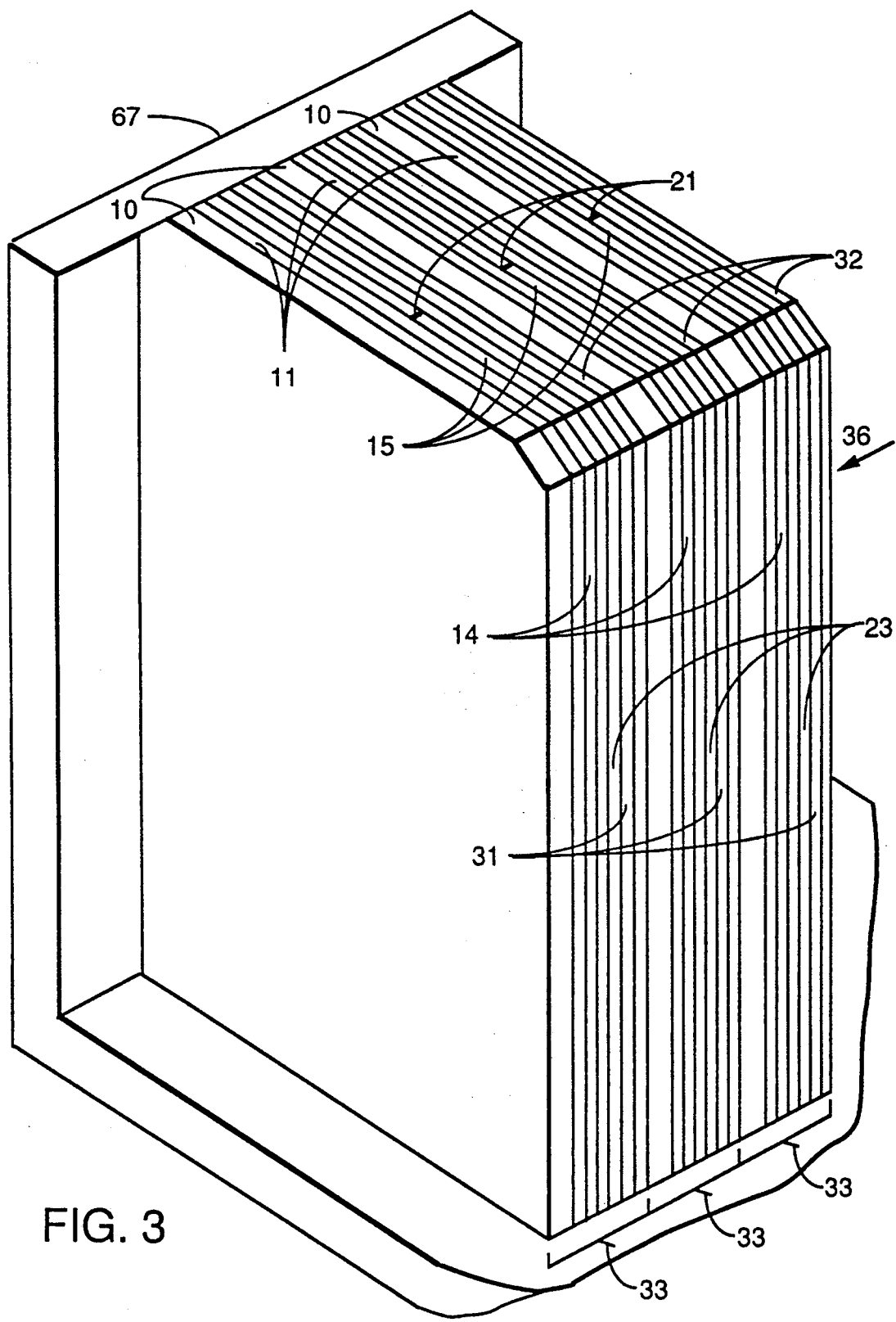
FIG. 3 is a schematic perspective view of an alternative embodiment showing a multitrack transducer assembly, having a plurality of stacked ultra narrow track transducers corresponding to the transducer of FIG. 1C, with magnetic shields and non-magnetic spacers interposed between the transducers.

Another embodiment of the present invention as shown in FIG. 3 may be manufactured by superposing two or more thin film magnetic transduces, such as shown at 33 in FIG. 1C, to form a laminated multitrack head stack 36. In this embodiment, the individual magnetic transducers correspond to that previously described with reference to FIG. 1C. When building multitrack transducer assemblies in accordance with the invention, it is preferable to utilize identical transducers built by batch fabrication on a plurality of substrates. When the steps necessary for building the individual transducers on the common substrates are completed, the resulting substrate assemblies are preferably superposed with the transducing gaps of each superposed transducer in alignment. The thusly obtained individual multitrack transducers may be separated by dicing process. When identical transducers are utilized, which have been built during the same batch fabrication process, the track-to-track uniformity is significantly improved.

Preferably a suitable mounting structure 67 is utilized to align the transducing gaps 21 so that they will extend in the same transducing gap plane, as it is known in the art. The thusly aligned individual transducers are integrally joined together, preferably by epoxy or glass bonding, utilizing well known bonding techniques. As it is seen from FIG. 3, the respective substrates 10 provide non-magnetic spacers between the adjacent tracks. Crosstalk reduction between adjacent tracks is provided by the magnetic shield layers 32. After the assembling step the structure 67 is removed and the multichannel head may be contoured to obtain a desired contour as it is well known.

The thusly manufactured multitrack transducer assemblies of the invention may be useful in very high frequency recording and playback applications of digital or frequency modulated signals. As it is well known, when the total bandwidth of the signal to be recorded exceeds the maximum bandwidth for one channel, the signal bandwidth may be divided into two or more parallel channels for recording and playback as it may be necessary, for example in high definition television signal recording and playback. These multitrack assemblies may be utilized in rotary scan as well as in longitudinal recording applications. For example, for recording a 1.2 Gigabit digital signal, that is having a total bandwidth of 600 MHz, the total bandwidth may be divided into 10 channels, each recording 60 MHz. For comparison, when frequency modulated signals are recorded on multiple parallel channels, a channel bandwidth of for example 50 MHz may be provided.

Figure 4:
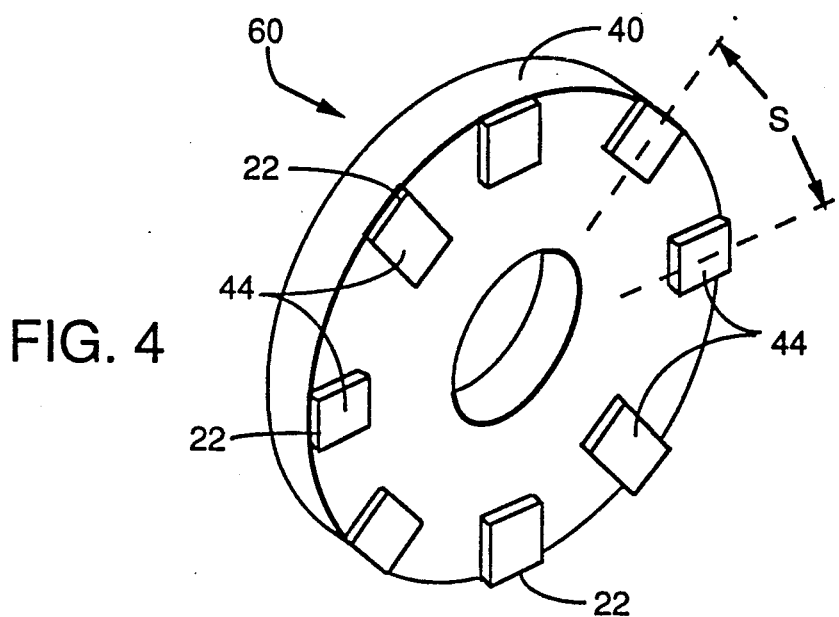
FIG. 4 is a schematic perspective view of a further embodiment of the invention showing a plurality of ultra narrow track transducers utilized in a rotary scan magnetic recording/playback device.

FIG. 4 shows a further embodiment of the invention in the form of a rotating wheel transducer assembly 60 which is particularly useful in rotary scan recorders. In this embodiment, a plurality of thin film magnetic transducers 44 with ultra narrow track width and small gap length are manufactured simultaneously by direct material deposition on a disk shaped substrate 40. Transducers 44 correspond to the previously described thin film transducers 33 shown in FIG. 1C, and the method of manufacturing is similar to the previously described method steps with reference to FIGS. 1A to 1C or FIG. 2. Therefore the description of the method will not be repeated with reference to FIG. 4. In this particular embodiment the individual transducers 44 are equidistantly spaced from each-other, at an angular spacing S, but it will be apparent that any desired location may be selected for each transducer on the substrate. It will be appreciated with reference to the foregoing description that the narrow track width of all the transducers 44 in this embodiment is defined by the thickness of the common magnetic core layer, which has been deposited during the same method step and therefore it is uniform for all the transducers on the common substrate. It will be also understood that the transducing gaps of all the transducers 44 are etched preferably by the same focused ion beam during the gap milling process. Consequently the respective transducing gaps as well as all other transducer dimensions have a desired uniformity.

Figure 5:
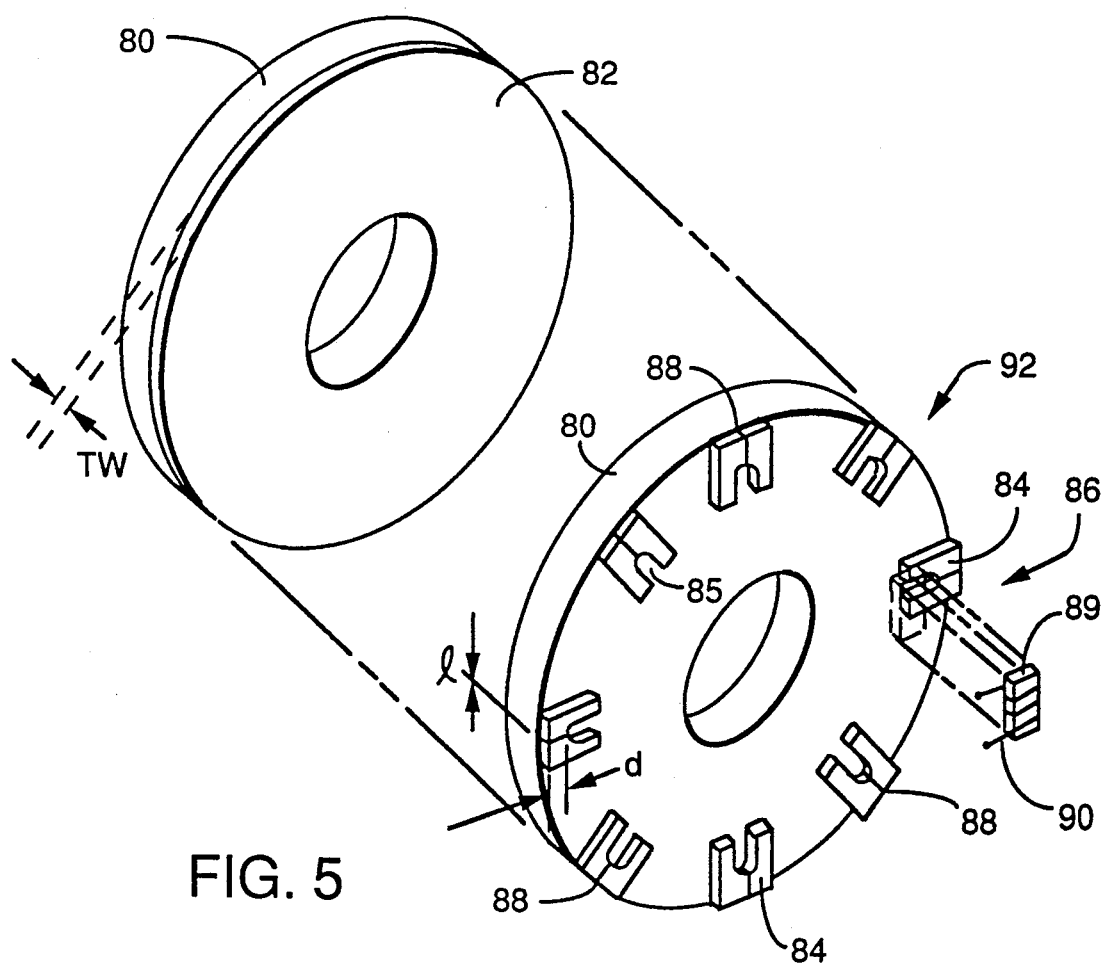
FIG. 5 is a schematic perspective view showing subsequent method steps of another embodiment utilized in a rotary scan magnetic recording/playback device.

A further alternative embodiment to the rotating wheel transducer assembly is shown in FIG. 5. With further reference to FIG. 5, a thin layer 82 of magnetic core material, for example Sendust, permalloy or amorphous material, is deposited on a disk shaped substrate, for example by well known sputtering. In accordance with the present invention, the thickness of layer 82 determines the track width TW of the transducers. Preferably TW=0.25 microns, but it may differ depending on the particular application or recording format utilized. Utilizing well known photolithography, the layer 82 is covered by a suitable photoresist. A mask (not shown) is provided in a desired shape of the individual magnetic cores, for example in the shape of front cores 84, having winding windows 85 provided therein, as shown in FIG. 5. The mask is photographed on the photoresist material and a photo image is developed. The areas not covered by the mask are etched, whereby all the magnetic material 82, with the exception of the cores 84 is removed, and the substrate 80 is exposed between the adjacent cores.

In accordance with the next method step, a focused ion beam (not shown) is applied to each individual core 84 and a transducing gap 88 is etched therein in a manner similar to that previously described with reference to FIGS. 1B or 2. The thusly etched gaps have a uniform depth d and a length l, and may have similar small dimensions as in the previously described transducer 33 of FIG. 1C. The individual transducers having thusly provided front cores 84 may be completed utilizing any known technique, by enclosing the magnetic circuit of each individual transducer, and providing transducing windings. In this example the transducer assembly of FIG. 5 is completed as follows.

Individual magnetic back cores 89 with transducing windings 90 provided thereon, are assembled with the front cores 84 such a way that the front and back cores partially overlap, as it is shown in FIG. 5 by dashed lines. Thereafter an insulation layer, for example silicon dioxide or glass, is sputtered over the entire surface of the rotating wheel assembly, filling the transducing gaps 88 and covering the assembled magnetic cores 84, 89, the windings 90, and the exposed areas of the substrate 80. This method step is similar to that previously described with reference to depositing insulation layer 23 shown in FIG. 1C. For better illustration of the underlying layers, the insulation layer is not shown in FIG. 5.

The resulting head wheel assembly 92 of FIG. 5 or the assembly 60 of FIG. 4 may be utilized in a rotating head scanner drum assembly (not shown), and attached thereto for example by epoxy or glass bonding in a well known manner.

It is a particular advantage of the embodiments of FIGS. 4 and 5 that the location and relative spacing of the individual transducer cores along the periphery of the head wheel assembly may change while the wheel assembly does not have to be redesigned. The size, shape and location of the transducers may be altered by simply changing the mask. It is a further advantage, that when it is necessary to change the transducing gap size, location or direction (angle), the focused ion beam may be simply redirected, without redesigning the entire transducer core structure, as it had to be done with prior art transducers. With respect to the extreme sharpness of the focused ion beam, no masking is necessary during the ion milling step.

It follows from the foregoing disclosure that in all the above described embodiments of the invention the transducing gap may be provided at an azimuth with reference to the plane of the magnetic core material layer. To obtain the foregoing, the plane of the magnetic core layer may be held at a selected oblique angle relative to the plane of the focused ion beam during the transducing gap milling process, as it is shown for example in FIG. 2.

It will be appreciated that in all the above described embodiments the track width is defined by the thickness of the thin film layer of the magnetic core material. The length and depth of the transducing gap are obtained by focused ion beam milling, and therefore, the minimum obtainable gap length and gap tolerances are limited only by the limitations of the particular focused ion beam technology utilized. As a result, extremely small track width and gap lengths with high accuracy can be obtained. At the same time a desired consistency and uniformity of all the simultaneously manufactured transducers is obtained.

While preferred embodiments of the invention have been described above and illustrated in the drawings, it will be appreciated that various alternatives and modifications may be made which will fall within the scope of the appended claims.

We claim:

1. A method of providing a thin film magnetic transducer, comprising the steps of:
   depositing a layer of magnetic material on a non-magnetic substrate, said layer having a thickness defining a track width of said transducer;
   directing a focused ion beam on said layer of magnetic material to separate said layer by etching to obtain two coplanar confronting magnetic poles defining a transducing gap therebetween, said transducing gap having predetermined length and depth; and
   depositing a layer of non-magnetic material over said layer of magnetic material to fill said transducing gap.

2. The method of claim 1 wherein said layer of magnetic material is made of a highly permeable soft magnetic material.

3. The method of claim 1 wherein said non-magnetic substrate is made of an electrically insulating material.

4. The method of claim 1 wherein said layer of non-magnetic material deposited over said layer of magnetic material is made of an electrically insulating material.

5. The method of claim 1 wherein said layer separating step comprises directing said focused ion beam in a direction perpendicular to a plane of said layer of magnetic material.

6. The method of claim 1 wherein said layer separating step comprises directed said focused ion beam in an oblique direction to a plane of said layer of magnetic material.

7. A method of making a thin film magnetic transducer, comprising the steps of:
   providing a plurality of first thin film conductor leads on a nonmagnetic, electrically insulating substrate;
   providing a first thin film layer of a non-magnetic, electrically insulating material extending over said first conductor leads;
   providing a second thin film layer of a magnetic material extending over said first layer said second layer having a thickness defining a track width of said transducers;
   etching said second layer by a focused ion beam to obtain two coplanar confronting magnetic poles defining a transducing gap therebetween, said transducing gap having a predetermined length and depth;
   providing a third thin film layer of a non-magnetic, electrically insulating material extending over said second layer and filling said transducing gap; and
   providing a plurality of second thin film conductor leads and connecting said first and second conductor leads to complete a transducer winding.

8. The method of claim 7 of providing a thin film transducer, further comprising the step of providing a fourth thin film layer of a non-magnetic, electrically insulating material extending over said second conductor leads.

9. The method of claim 8 further comprising the steps of superposing and integrally joining at least two said thin film transducers with their respective transducing gaps aligned to obtain a multitrack thin film transducer assembly.

10. A method of making a thin film multitrack magnetic transducer assembly having a plurality of thin film magnetic transducers, wherein a method of manufacturing each transducer comprises the steps of:
   providing a plurality of first thin film conductor leads on a nonmagnetic, electrically insulating substrate;
   providing a first thin film layer of a non-magnetic, electrically insulating material extending over said first conductor leads;
   providing a second thin film layer of a magnetic material extending over said first layer said second layer having a thickness defining a track width of said transducers;
   etching said second layer by a focused ion beam to obtain two coplanar confronting magnetic poles defining a transducing gap therebetween, said transducing gap having a predetermined length and depth;

providing a third thin film layer of a non-magnetic, electrically insulating material, extending over said second layer and filling said transducing gap;

providing a plurality of second thin film conductor leads on said third layer and connecting said first and second conductor leads to complete a transducer winding;

providing a fourth thin film layer of a non-magnetic, electrically insulating material, extending over said second conductor leads to obtain a thin film magnetic transducer; and superposing and integrally joining together a plurality of said thin film transducers with their respective transducing gaps aligned, to obtain a thin film multitrack magnetic transducer assembly.

11. A method of providing a thin film rotary scan magnetic transducer assembly having at least two thin film transducers spaced along a periphery of a disk shaped substrate, comprising the steps of:

providing a disk shaped substrate of a non-magnetic material;

depositing a layer of magnetic material in the form of spaced transducer cores on said substrate, said layer having a thickness defining a track width of said transducers;

etching said layer of magnetic material of each said core by a focused ion beam to obtain two coplanar confronting magnetic poles defining a transducing gap therebetween, said transducing gap having a predetermined length and depth; and depositing a layer of non-magnetic material over said layer of magnetic material to fill the transducing gaps.

12. The method of claim 11 wherein said step of depositing said layer of magnetic material comprises providing a plurality of equidistantly spaced coplanar magnetic transducer cores along the periphery of said substrate and wherein respective transducing gaps of each transducer are etched by the same focused ion beam.

* * * * *